June 9, 1936.                A. M. WILHELM                 2,043,847
                      LANDING INDICATOR FOR AIRPORTS
                  Filed Nov. 11, 1929            2 Sheets-Sheet 1
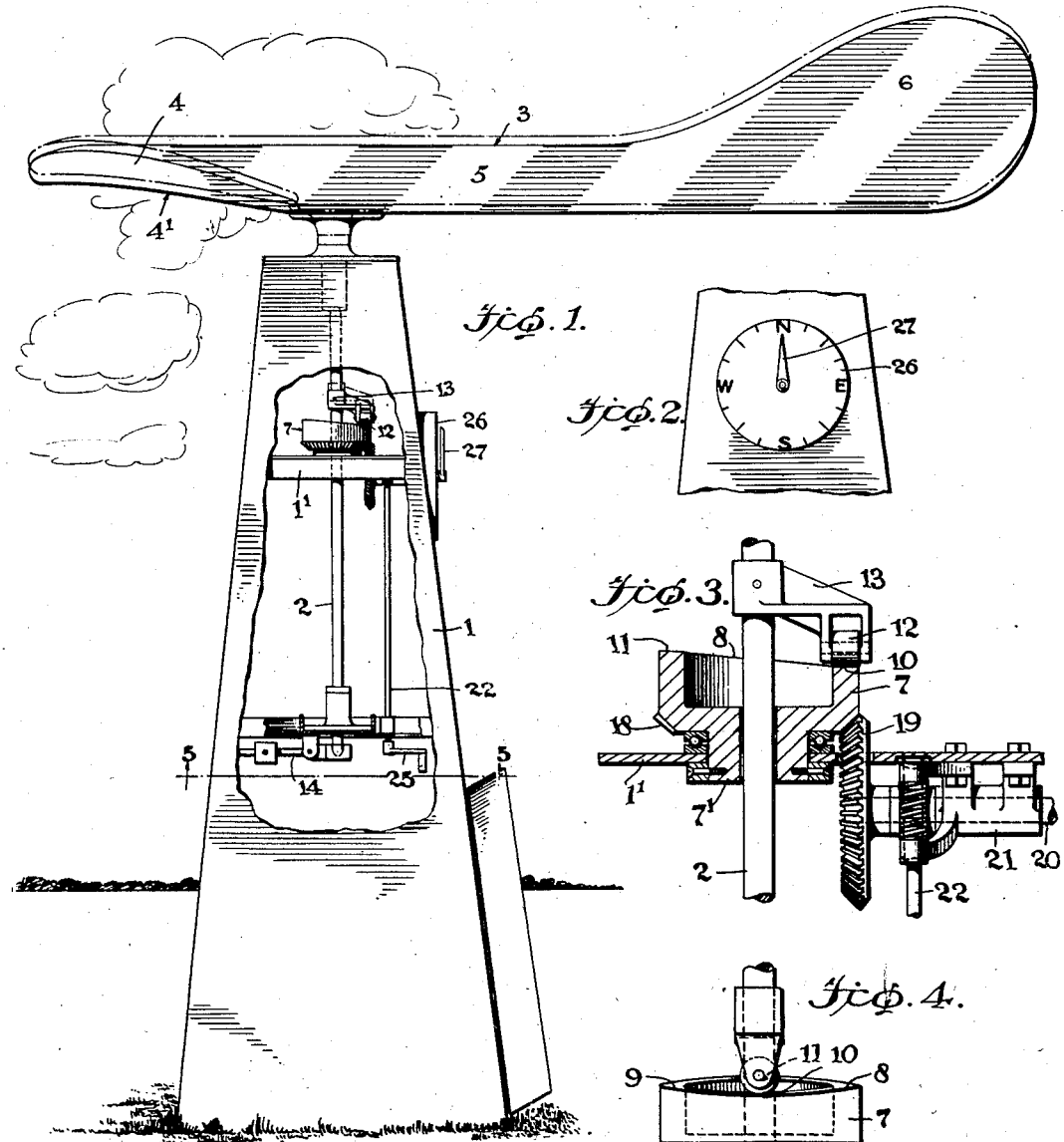

June 9, 1936.   A. M. WILHELM   2,043,847
LANDING INDICATOR FOR AIRPORTS
Filed Nov. 11, 1929   2 Sheets—Sheet 2

Arthur M. Wilhelm Inventor

By Bartow A. Bean Jr.
Attorney

Patented June 9, 1936

2,043,847

UNITED STATES PATENT OFFICE 2,043,847

LANDING INDICATOR FOR AIRPORTS

Arthur M. Wilhelm, Randolph, N. Y.

Application November 11, 1929, Serial No. 406,409

14 Claims. (Cl. 73—55)

This invention relates to a landing indicator for airports to facilitate and guide the aviator in making a landing in all weathers.

In landing an airplane it is most desirable for the greatest safety to land "into the wind", and devices have therefore been devised to inform the aviator as to the direction of the wind, such as tubular bags or socks which are mounted so as to receive and be extended by the wind to an indicating position. More recently indicators have been designed having the general shape of an airplane and sometimes referred to as a T which are pivotally mounted and have a tail fin adapted to be acted upon by the wind currents more in the nature of a weather vane whereby the wind will automatically position the T for the proper indication of the wind direction. The T if of a considerable size so as to be more readily discernible from the air, and may be given a distinguishing color.

The modern airport is provided with a plurality of runways extending in different directions whereby the aviator is required to make his selection of a runway more nearly paralleling the direction of wind as indicated by the T or other indicating member. Being given a wide range of selection, the aviator will find the proper runway on which to land into the wind.

When the wind is not blowing at all the T will be disposed in the position to which it was last set by the wind and the aviator will, of course, make a landing along the designated runway. With no wind blowing the aviator may have a preference as to the runways for landing his machine, as one runway may be more suitable and desirable for landing than the other runways, omitting the wind as a factor, and, therefore, the aviator would prefer to make his landing on the best one of the runways providing he has some assurance that the wind is not blowing from another direction, or when there is a calm. Since the T remains during a calm as last set by the wind unless thereafter it is manually set to another position, there is no assurance as to the correctness of the indication for the reason that the attendant may forget to manually set the indicator in calm weather.

The primary object and aim of the present invention is to provide a landing indicator for airports which will overcome the disadvantages above set forth, and will always designate the runway most suitable under the then prevailing weather conditions for the safest landing.

The invention will be found to reside further in the provision of an indicator which may be set to normally indicate a preferred runway and which, while responsive to wind currents for indicating the direction of the wind when blowing, will automatically return to its normal position upon the wind falling below a predetermined velocity, or when a substantially calm condition exists.

The invention further resides in a landing indicator for airports by which a predetermined normal position may be obtained for indicating a selected one of the various runways.

The invention further resides in the arrangements and combinations of parts hereinafter set forth and in the salient features of construction more specifically referred to in the following description, reference being had to the accompanying drawings wherein Fig. 1 is an elevation, partly broken away, depicting the landing indicator in its preferred embodiment.

Fig. 2 is a fragmentary elevation showing the setting dial.

Fig. 3 is a detail vertical section through the locator.

Fig. 4 is a similar view taken at right angles from the point of view for Fig. 3.

Fig. 5 is a bottom plan view about on line 5—5 of Fig. 1.

Figure 6:
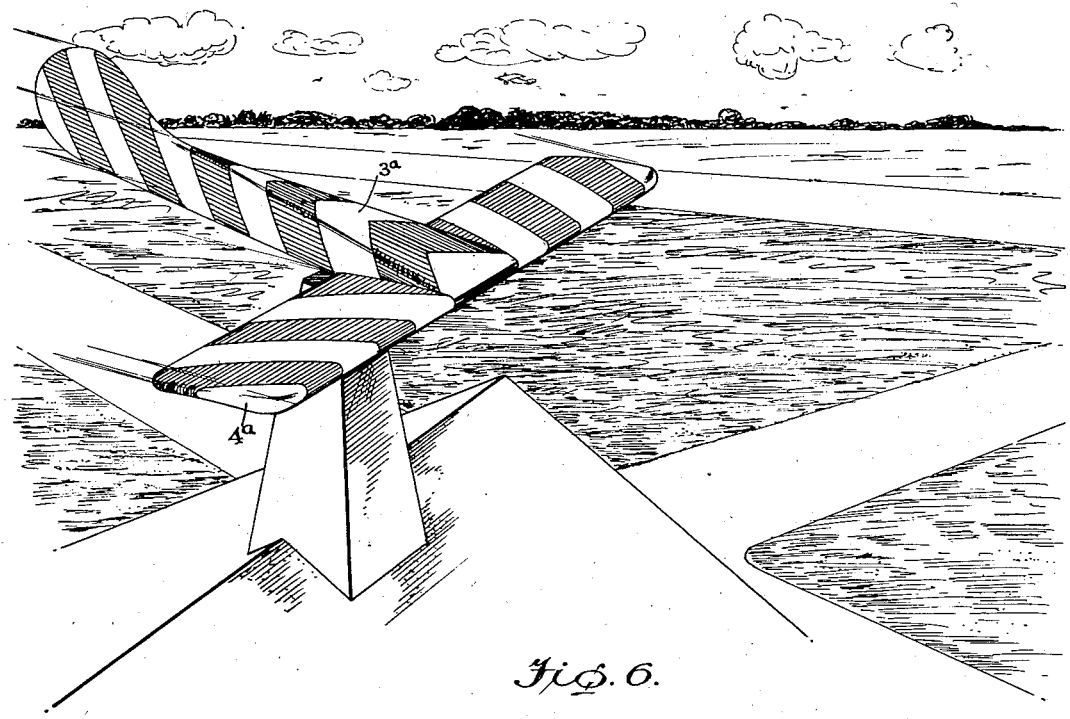
Fig. 6 is a perspective view more clearly showing the application of the present invention.

The invention comprises in its broad aspect an indicating means which is responsive to wind currents, associated with a locating means for returning the indicating means to designate a normal or preferred landing runway when the wind is substantially nil.

Referring more in detail to the embodiment of the invention illustrated in Fig. 1, the indicator includes a supporting structure 1, such as a tower or one of the buildings at the airport, in which a vertical shaft 2 is journaled in a manner to permit limited vertical movement. On the upper end of the shaft is fixed an indicator body or indicating member 5 for pointing out to the aviator the preferred landing runway of the airport. A tail fin 6 is provided on the body 5 to be acted upon by the wind to cause the member 5 to point into the wind, so that the preferred runway, indicated by member 5, will coincide with the direction of the wind.

Wind actuated elevating means, for a purpose which will be more fully described hereinafter, are also provided, the same constituting a wing member 4 having an inclined under surface 4'. In the illustrated embodiment, the member 4, for simplicity of structure, is fixed to and carried by the body 5, so that the members 4, 5 and 6 constitute a unitary body 3, of T-shape in plan and generally simulating the appearance of an airplane. The combining of the indicating means and wind actuated elevating means affords the further advantage, particularly in the event an airplane is in such nearly vertical alignment with the indicator that the tail 6 cannot be distinguished by the aviator, that the wing member 4 clearly shows which end of the direction indicating member 5 is heading into the wind.

The indicator also includes means for automatically restoring the member 5 to a position for locating the preferred, calm weather runway. The locating means herein depicted as the preferred embodiment, comprises a locator element 7 surrounding the shaft and provided with a track or camway having two active or return portions 8 and 9 rising in opposite directions from a dwell or rest station 10 and merging at a high point, as indicated at 11, in a manner to avoid a further dwell portion. Tracking on this camway is a follower 12 which is supported by a bracket arm 13 carried by the shaft 2. The dwell or rest point 10 is disposed on a radial line from the shaft 2 substantially paralleling the preferred runway of the airport, and the follower 12, seeking the rest station 10 under the weight of the unit as a means, will urge and act, in the absence of a contrary wind, to return the member 5 with the shaft 2 and the bracket 13 as a unit, to the indicating or normal position to locate the preferred runway.

Now with the wind blowing at an angle or contrary to the normal position, its influence on the tail fin 6 will swing the member 5 to correspond to the direction of the wind current, and thereby cause the follower 12 to ascend the corresponding rise portion 8 or 9, depending upon the direction of the wind. While the wind is blowing the elevating means, i. e., the inclined wing 4, will move upwardly and remain in elevated position, lifting and retaining the follower 12 clear of the locator 7, thereby allowing absolute freedom of movement of the member 5 about the axis of shaft 2. Without the wind actuated elevating means, such freedom of movement will be lacking, although the resistance offered by the locator will be small in comparison with the pressure of the wind against the tail fin causing the member 5 to point into the wind. When the wind velocity is very low or nil, the elevating means will become ineffective, the follower 12 will be pressed against the locator 7 by the weight of the parts 4, 5 and 6, and as the air pressure against tail 6 will also be small or nil, the follower will return to the rest station, bringing member 5 back to the desired normal position.

The sensitiveness of the indicator to the wind pressure may be adjusted to respond to light winds, such as those having a velocity of two or three miles an hour, if this fineness is desired. This I may accomplish by counterbalancing the unit 3, as by means of a lever 14 fulcrumed at 15 on the support 1 and carrying a thrust bearing 16 at one end to receive and support the lower end of the shaft 2. The opposite end of the lever is graduated and carries a counterbalancing weight 17 by the adjustment of which the unit 3 is set to respond to wind currents of almost negligible velocity.

The term "calm weather" is therefore used herein broadly to include such winds which have a velocity less than that required to motivate the indicator.

In order to render the indicator adjustable for the selection of a different calm weather runway to suit the airport conditions, I adjust the follower and locator relative to one another. In this instance the locator element is adjusted. To this end, the element has a hub 7' journalled in a transverse support 1', and a gear 18 is fixed relative to the locator 7 and in meshing relation with a second bevel gear 19 carried by a shaft 20. This shaft is journalled in a bracket 21 which may also support a manually operable shaft 22, the shafts 20 and 22 being interconnected by a worm 23 and a worm gear 24. The shaft 22 is extended to within easy reach of the operator and is provided with a handle 25 or some other control by which the shaft may be manipulated. By rotating the locator 7 the dwell or rest station 10 is adjusted, and in order for the operator to determine the position of the station, which of course may be adjusted while the indicator is being influenced by the wind, I have provided a setting dial 26 with a cooperating pointer 27 connected to the shaft 20 for operation thereby. In Fig. 2 the dial setting indicates that the normal position of the locator element is due north and therefore the member 5, in the absence of a contrary wind, will return to a position pointing due north. If the locator is adjusted so that the pointer 27 indicates due east, or any other desired indication, the member 5 will seek and return to a due east normal, or such other preselected position, when uninfluenced by the wind.

Figure 7:
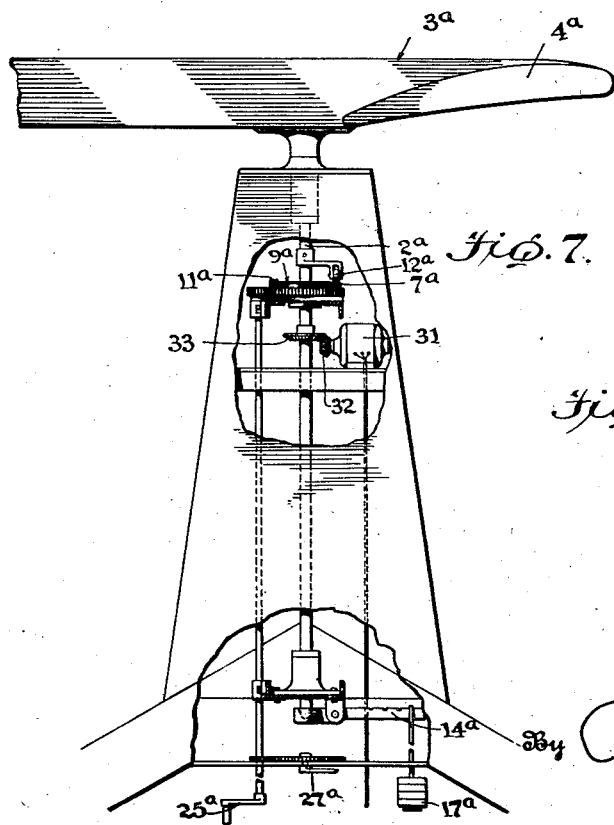
Fig. 7 is an elevation, partly broken away, depicting a modified embodiment utilizing electrical equipment.
Figure 8:
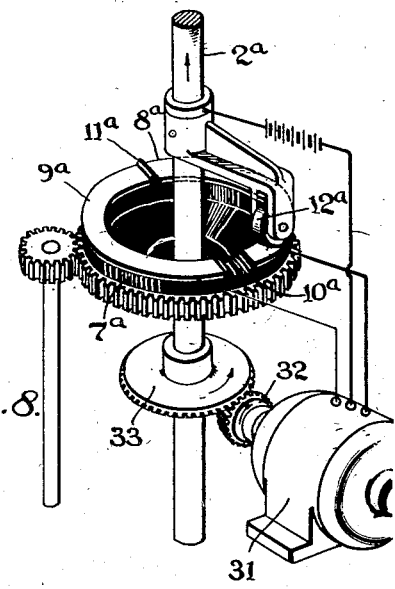
Fig. 8 is a detail perspective view of the locator employed in the modification.

In Figs. 7 and 8 I have shown an embodiment of my invention in which the mechanical force is replaced by electrical means. In this embodiment the vertical shaft 2a carries a follower 12a designed to contact with a locator 7a. The locator may consist of a trackway having an insulated or electrically inactive rest station 10a, active portions or segments 8a and 9a extending therefrom to opposite sides and being connected by an insulation 11a. The portions 8a and 9a are connected in circuit to a reversible motor 31 and through the latter to the follower or contact 12a. Normally the contact is engaged in a depression in the rest station, but when the contact engages either section 8a or 9a the motor 31 will be correspondingly energized to rotate the gear 32 which in turn will drive the gear 33 to rotate the shaft 2a. The unit 3a has the under surface of the wing or elevating means 4a inclined to be acted upon by the wind in lifting the unit vertically. Obviously, other portions of the indicator may have their under surfaces inclined so as to receive the upward wind pressure from any direction to insure of the contact 12a lifting immediately from the locator. The lifting force of the wind will thereby effect elevation of the follower contact 12a from off the locator, and should the wind cease to blow and the contact drop upon either portion 8a or 9a of the indicator the motor 31 will be set in operation to restore or return the indicator to the predetermined normal position. In this simplified showing the gear 33 will be lifted out of connection with the drive 32 when the unit 3a is lifted.

In the modified showing the manual setting of the locator is accomplished in a suitable manner, as by means of the handle 25a, and the accuracy of the setting may be determined by the pointer 21a. The unit 3a may be counterbalanced by the lever 14a and the weight 17a, in a manner similar to that shown in the preferred form of the invention.

In either form of the invention the landing indicator may be given a predetermined normal designation for indicating the preferred landing runway during calm weather, and at the same time is responsive to wind currents for indicating the direction thereof when present. The aviator is thereby cautioned of the fact that there is a wind when such is the case, and is insured of the indicator designating the preferred runway in the absence of any contrary wind. The indicator may therefore be relied upon as always indicating the runway for the safest landing since the human agency has been eliminated in returning the indicator to the desired normal when the wind ceases to blow and therefore the aviator may depend upon the indicator as truly functioning for safety in landing.

In the preferred embodiment, the means utilized to cooperate with the locator and follower are of a mechanical nature, while in the modification this means is of an electrical nature for accomplishing the same purpose. It is therefore apparent that while I have disclosed these forms of my invention in the drawings for the purposes of illustration, obviously I do not intend to limit myself except as may be required by the appended claims.

What is claimed is:

1. A landing indicator for airports having a plurality of runways, comprising an indicator member responsive to wind currents for indicating the direction of landing in the presence of such wind currents, a vertically disposed shaft supporting the indicator member for such indicating movement, a locator having an active portion and a rest portion by which a preferred runway can be predetermined for calm weather landing as determined by the position of the rest portion, means operable by the shaft and cooperating with said locator for returning the indicator member to a predetermined position, said means being rendered inoperative by axial movement of the shaft, and an adjustable counterbalance device having a thrust bearing supporting the shaft, said indicator member having a surface for the application of an upward pressure from the wind for shifting said shaft axially to render said means inoperative during the prevalence of the wind.

2. A landing indicator for airports having a plurality of runways, comprising an indicator member responsive to wind influences by pointing out a runway for landing in the presence of such wind influences, a vertically disposed shaft supporting the indicator member for such indicating movement, a locator having an active portion and a rest portion, a part connected to the shaft and, in the absence of a contrary wind, cooperating with said locator for returning the indicator member to a normal position for designating a pre-selected runway at the airport for use in calm weather, means for varying the responsiveness to the wind of said indicator member, and means for adjusting the locator relative to the shaft part for varying the predetermined normal position.

3. A landing indicator for airports comprising an indicator member having a tail fin acted upon by the wind to indicate the direction of the wind, and a forwardly and upwardly inclined surface for being acted upon by the wind to lift the indicator member, a shaft supporting the indicator member and mounted for both rotary and axial movements, a locator surrounding the shaft and having a rest portion and oppositely extending active portions, and means normally engaged with the rest portion and operable by the shaft and cooperable with a respective one of the active portions to return said means to the rest portion of the locator and thereby restore the indicator member to a normal position for indicating a predetermined landing direction at the airport.

4. A landing indicator for airports, comprising an indicator member responsive to wind currents for designating the direction of the wind, a shaft supported for rotary and axial movement and carrying the indicator member for wind responsive movements both rotary and axial, said indicator member having surfaces acted upon by the wind to both rotate and lift said member and shaft as a unit, a locator having a cam surface rising about the shaft from a rest portion, and an arm carried by the shaft and normally engaged with the rest portion of the cam surface to hold the indicator member at a predetermined position, said arm being disengaged from the cam surface by and during lifting movement of said member and shaft unit and when engaged with the cam surface being urged thereby under the weight of said unit toward said rest portion.

5. A landing indicator for airports, comprising an indicator member responsive to wind currents for designating the direction of the wind, a shaft supported for rotary and axial movement and carrying the indicator member for wind responsive movements both rotary and axial, said indicator member having surfaces acted upon by the wind to both rotate and lift said member and shaft as a unit, a locator having a cam surface rising about the shaft from a rest portion, means for adjusting the locator about the shaft to vary the position of the rest portion, and an arm carried by the shaft and normally engaged with the rest portion of the cam surface to hold the indicator member at a predetermined position, said arm being disengaged from the cam surface by and during lifting movement of said member and shaft unit and when engaged with the cam surface being urged thereby under the weight of said unit toward said rest portion.

6. A landing indicator for airports, comprising an indicator member responsive to wind currents for designating the direction of the wind, a shaft supported for rotary and axial movement and carrying the indicator member for wind responsive movements both rotary and axial, said indicator member having surfaces acted upon by the wind to both rotate and lift said member and shaft as a unit, means for adjustably counterbalancing the unit whereby winds of differing velocity may act to lift the same, a locator having a cam surface rising from a rest portion about the shaft, and an arm carried by the shaft and normally engaged with the rest portion of the cam surface to hold the indicator member at a predetermined position, said arm being disengaged from the cam surface by and during lifting movement of said member and shaft unit and when engaged with the cam surface being urged thereby under the weight of said unit toward said rest portion.

7. A landing indicator for airports, comprising an indicator member responsive to wind currents for designating the direction of the wind, a shaft supported for rotary and axial movement and carrying the indicator member for wind responsive movements both rotary and axial, said indicator member having surfaces acted upon by the wind to both rotate and lift said member and shaft as a unit, a locator having a plurality of insulated segments arranged about the shaft with an interposed rest portion, and a contact member carried by the shaft for tracking about the segments in electrical contact therewith, an electrical drive for imparting rotary movement to the unit, said drive being connected in circuit through the segments and said contact member, which circuit is interrupted when said contact member is engaged with said rest portion and said circuit being broken when the indicator member is acted upon by the wind.

8. A landing indicator for airports, comprising an indicator member responsive to wind currents for designating the direction of the wind, a shaft supported for rotary and axial movement and carrying the indicator member for wind responsive movements both rotary and axial, said indicator member having surfaces acted upon by the wind to both rotate and lift said member and shaft as a unit, a locator having a plurality of insulated segments arranged about the shaft with an interposed rest portion, means for selectively locating the rest portion about the shaft, and a contact member carried by the shaft for tracking about the segments in electrical contact therewith, an electrical drive for imparting rotary movement to the unit, said drive being connected in circuit through the segments and said contact member, which circuit is interrupted when said contact member is engaged with said rest portion, and said circuit being broken when the indicator member is acted upon by the wind.

9. A landing indicator for airports, comprising an upright shaft, an indicator member mounted thereon and having means acted upon by wind currents to rotate the member about the axis of the shaft, a cam track element adjacent the axis of the shaft, a follower element for the track element, one of said elements being connected for movement with the indicator member and both elements coacting to move the latter to a predetermined position in the absence of wind currents, and means operated by the wind currents for moving one of said elements out of coacting relationship with the companion element.

10. A landing indicator for airports, comprising an indicator member, means mounting the indicator member for wind responsive movement about a substantially vertical axis a locator element extending about the axis of rotation and having an inclined cam portion and a dwell portion, a follower element cooperating with the locator element, one of said elements being fixed and the companion element connected to the indicator member for movement therewith, means for causing said follower element and said locator element to contact normally under pressure tending to urge said follower element down the inclined cam portion to rest on said dwell portion, one of said elements being movable out of cooperative relation with the companion element for relieving the indicator member of such urge whereby said indicator member is free to respond to wind influences, and said indicator including a wind actuated part operatively connected to said movable element and actuated by the wind to move said element out of cooperative relationship with the companion element to relieve said indicator member from such urge.

11. A landing indicator for airports comprising an indicator member, means mounting the same for rotary movement and also movement longitudinally of the axis of rotation, said indicator member having a surface acted upon by the wind for imparting rotary movement to said indicator member, said indicator member also having a surface acted upon by the wind for imparting axial movement thereto, and means for placing the indicator member under a rotary urge to move to a predetermined indicating position, said urge means having a part movable to render the same inoperative, said part being connected to said indicator member for being moved to its inoperative position by and during axial movement of said indicator member.

12. A landing indicator for airports, comprising an indicator member, means mounting the same for rotative movement about a vertical axis, said indicator member having a surface acted upon by the wind for imparting rotative movement to the indicator member for indicating the direction of the wind, and means actuated by the effective weight of said indicator member for moving the latter to a predetermined indicating position, said indicator member having another surface acted upon by the wind for relieving said member moving means from the actuating weight of said indicator member whereby the latter will be free to have rotative movement imparted thereto by the wind.

13. In a landing indicator for airports, a wind responsive indicator, means supporting said indicator for movement by wind of more than a predetermined velocity to indicate the wind direction, an electric motor, reduction gearing connecting the motor to the indicator for moving the latter at a reduced speed, and means operable in the absence of wind of such velocity for causing said motor to operate to move the indicator to a predetermined position.

14. In a landing indicator for airports, a wind responsive indicator, means supporting said indicator for movement by wind of more than a predetermined velocity to indicate the wind direction, a reversible electric motor, reduction gearing connecting the motor to the indicator for moving the latter at a reduced speed, a track member and a follower member thereon, one of said members being movable in accordance with movement of the indicator, said track comprising two segments separated by a rest portion, an electric circuit including the motor and one segment and the follower for effecting operation of the motor in one direction in the absence of wind of at least said predetermined velocity, and another electric circuit including the motor and the other segment and the follower for effecting operation of the motor in the opposite direction in the absence of wind of at least said predetermined velocity.

ARTHUR M. WILHELM.